May 16, 1961 W. C. JOHNSON 2,983,993
SHEET OR PLATE METAL ARTICLES HAVING HOLLOW
SECTIONS AND METHOD OF MAKING THE SAME
Filed Aug. 1, 1955 3 Sheets-Sheet 1
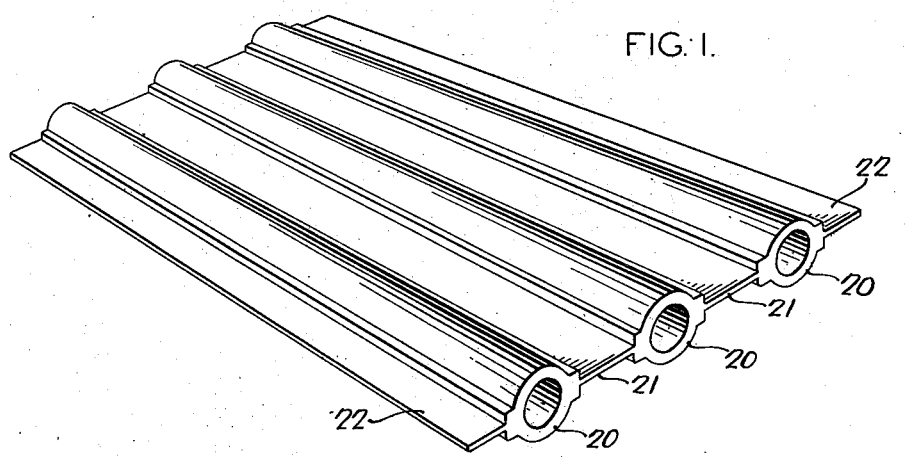
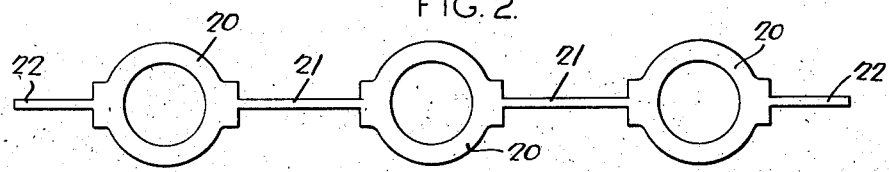
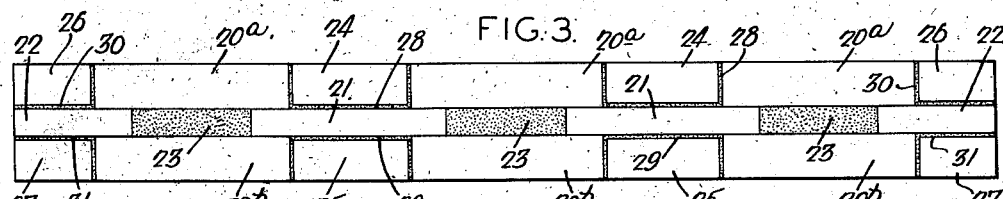
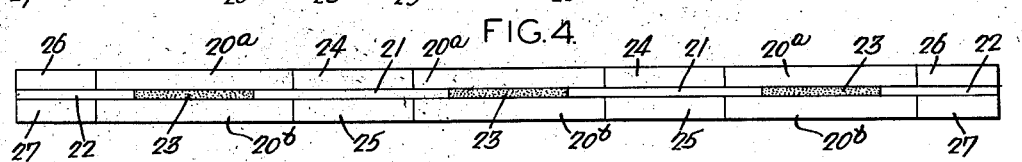
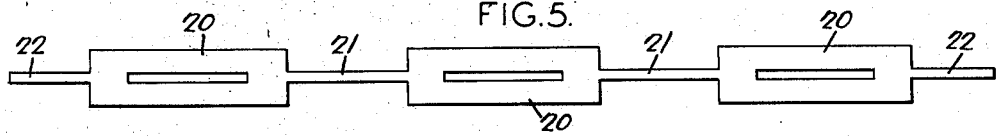
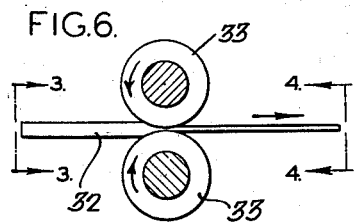
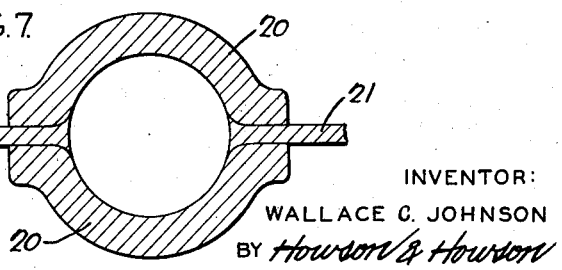
INVENTOR:
WALLACE C. JOHNSON
BY Howson & Howson
ATTYS.

May 16, 1961 W. C. JOHNSON 2,983,993
SHEET OR PLATE METAL ARTICLES HAVING HOLLOW
SECTIONS AND METHOD OF MAKING THE SAME
Filed Aug. 1, 1955 3 Sheets-Sheet 2
FIG. 8.
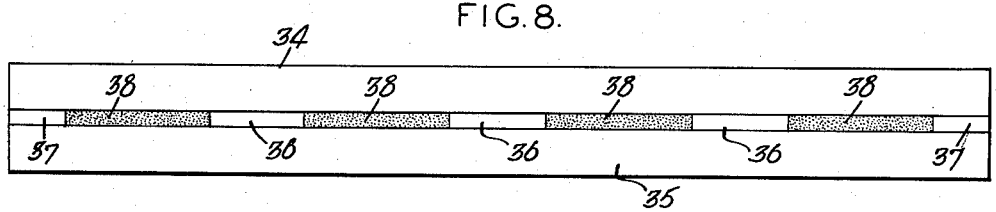
FIG. 9.
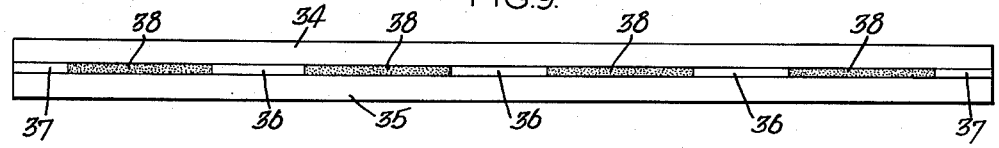
FIG. 10.a
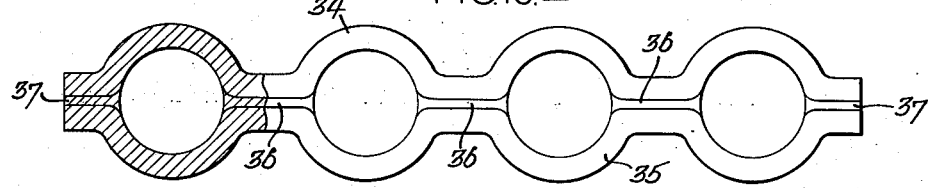
FIG. 10.b
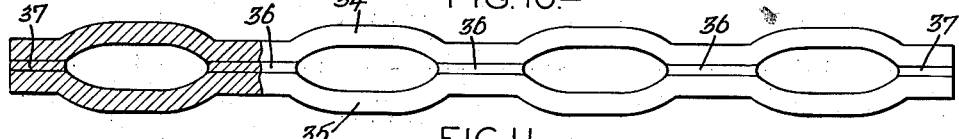
FIG. 11.
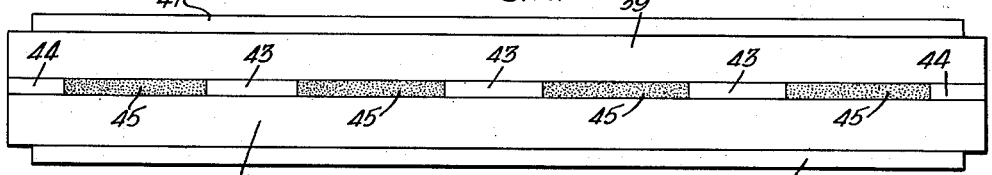
FIG. 12.
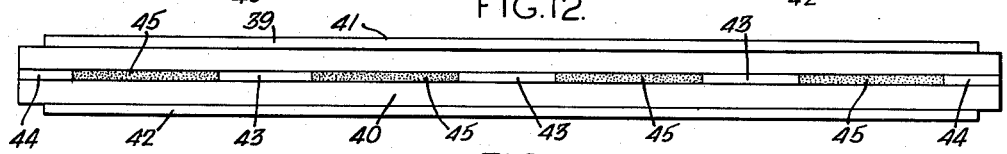
FIG. 13.
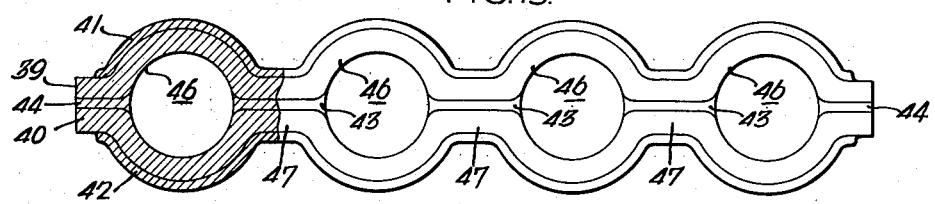
INVENTOR:
WALLACE C. JOHNSON
BY Howson & Howson
ATTYS.

INVENTOR:
WALLACE C. JOHNSON
BY Howson & Howson
ATTYS.

United States Patent Office 2,983,993
Patented May 16, 1961

2,983,993

SHEET OR PLATE METAL ARTICLES HAVING HOLLOW SECTIONS AND METHOD OF MAKING THE SAME

Wallace C. Johnson, St. Davids, Pa., assignor to Olin Mathieson Chemical Corporation, East Alton, Ill., a corporation of Virginia Filed Aug. 1, 1955, Ser. No. 525,567

1 Claim. (Cl. 29—157.3)

This invention relates to sheet or plate metal articles having hollow formations or sections mechanically connected by joining sections. Articles of this general type have come into use for various purposes. For example, such articles may be used in heat exchange structures in refrigerators and the like, in which it is desired to pass a heating or cooling fluid through passages formed in the structure. Articles of this general type have been made in the past by hot rolling two superposed metal members with stop-weld material therebetween in the areas which are to form the hollow sections, thus effecting welding of the two members in the areas which are to form the joining sections and also reducing the thickness of the structure, then cold rolling the structure to the desired thickness for the article being formed, and then introducing fluid pressure between the unwelded areas to expand the two members in the latter areas so as to form the hollow sections. Such process is fully described in U.S. Patent No. 2,690,002, issued September 28, 1954 to L. H. Grenell, and in U.S. Patent No. 2,662,273, issued December 15, 1953 to G. R. Long.

One object of the present invention is to provide new and improved structures and novel methods of making the same involving welding by hot rolling of metal members and expansion of selected areas.

Another object of this invention is to simplify and facilitate the welding by hot rolling of metal members, and to effect better bonding of the members, through the use of fluxes and/or oxidizers as hereinafter described.

In accordance with one feature of this invention, metal inserts are employed in association with outer metal members in the areas which are to form the joining sections, and stop-weld material is provided in the internal spaces defined by said members and inserts, the assembly forming a pack structure which is hot rolled to effect welding of the outer members and inserts and to reduce the thickness of the structure.

In accordance with another feature of this invention, fluxes may be employed on the surfaces to be welded and/or oxidizers may be employed in the stop-weld material to accomplish desirable results and to attain desirable advantages.

I have discovered that various advantages and novel structures can be obtained by means of pack structures employing inserts as above mentioned. One advantage of the use of such inserts is than when the unwelded portions of the outer members are expanded by fluid pressure, the inserts form portions of the internal wall of each hollow section and give smoothly rounded surfaces. In the prior method by which two members are directly bonded together in the areas which are to form the joining sections, the expansion of the unwelded areas causes a sharply defined V or notch where the expanded portions diverge, resulting in internal stresses and weakening of the material and sometimes causing rupture upon full expansion. This objection is eliminated by the use of inserts in accordance with the present invention.

Another advantage of the use of such inserts is that they may be composed of lower melting metal than that of the outer members, enabling pressure welding at lower rolling temperatures than those required where two higher melting members, such as steel sheets or plates, are directly welded together by hot rolling.

Further still, by the use of inserts in a manner hereinafter described, it is possible to make articles having joining or web sections of a thickness less than the wall thickness of the hollow sections. Such a structure is useful in instances where heavy walled hollow sections are required but relatively thin web sections are desired, as where it is desired to minimize heat conduction in the web sections or where it is desired to minimize weight as in aircraft. Such a structure cannot be obtained by the prior method involving direct bonding of only two members in the joining or web sections, since by that method the joining or web sections are caused to have a thickness which is twice the wall thickness of the hollow sections.

It is also possible, by the use of inserts according to this invention, to make articles having internal cladding in the hollow sections. Thus, it is possible to provide stainless steel or copper internal cladding or lining in instances where rust-proof internal surfaces are desired.

I have also discovered that, in any process involving welding by hot rolling of metal members, the necessity for sealing the assembled members against entrance of air to prevent oxidation can be eliminated, and better and more efficient bonding of the members can be accomplished, through the use of fluxes and/or oxidizers.

The foregoing and other objects and advantages of this invention will be apparent from the following detailed description with reference to the accompanying drawings, wherein Fig. 1 is a perspective view of a sheet or plate formed according to this invention, having relatively thick walled tubular sections and relatively thin joining or web sections;

Fig. 2 is an end view of the sheet or plate;

Fig. 3 is an end view, taken on line 3—3 of Fig. 6, showing the pack structure prior to passage between rolls, such pack structure being employed in the making of articles such as that shown in Figs. 1 and 2;

Fig. 4 is an end view taken along line 4—4 of Fig. 6 showing the structure after passage between the rolls and after welding of certain members by the hot rolling;

Fig. 5 is a view similar to Fig. 4 after removal of the space-filling members;

Fig. 6 is a small scale view showing hot rolling of the sandwich structure;

Fig. 7 is a fragmentary sectional view showing one of the expanded tubular sections and portions of adjacent web sections;

Fig. 8 is an end view of a relatively simple pack structure which may be employed where thickness of the joining sections is immaterial;

Fig. 9 is an end view of the same structure after hot rolling;

Fig. 10a is an end view of the resulting article after expansion of the unwelded areas without restraining dies to form the hollow sections;

Fig. 10b is a similar view of the article produced with restraining dies;

Fig. 11 is an end view of a pack structure including external cladding members;

Fig. 12 is a similar view of the same structure after hot rolling;

Fig. 13 is an end view of the finished article;

Figure 14:
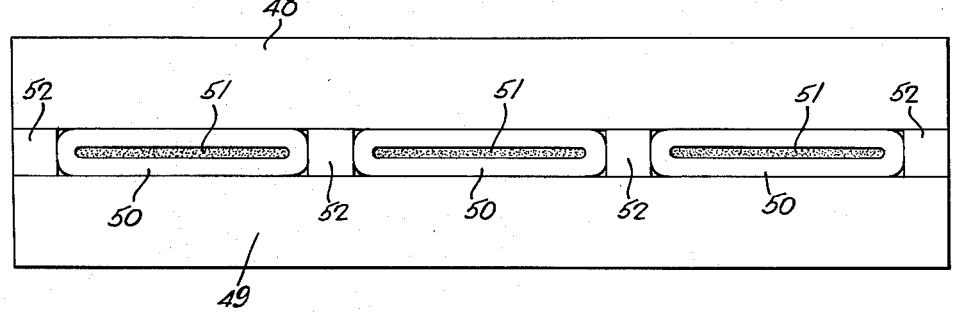
Fig. 14 is an end view of a pack structure including internal cladding members.

Referring first to Figs. 1 and 2, there is shown a plate or sheet article comprising relatively thick-walled tubular sections 20, thin joining sections 21, and thin marginal sections 22. As previously mentioned, such a structure is desirable in some instances but it has been impossible of attainment by the prior method involving direct bonding of only two sheet members.

In accordance with the present invention, such structure is provided by first building up a special pack structure as shown in Fig. 3, then heating the pack structure to a suitable temperature for welding by hot rolling, and rolling it in the lengthwise direction of the pack components to convert it to the form shown in Fig. 4, then cold rolling it where necessary to obtain the desired final thickness, then removing certain of the members to provide the form shown in Fig. 5, and finally applying fluid pressure to the internal spaces to form the tubular sections, one of which is shown in Fig. 7.

Referring to Fig. 3, a pack structure is first built up comprising outer metal members 20a and 20b in the form of rather thick rectangular elongate blocks, which members are to form the tubular sections 20 in the finished article, inner metal inserts 21 in the form of rectangular elongate insert blocks which become the web sections and which extend widthwise between marginal areas of the outer metal members 20a and 20b, side metal inserts 22 which extend between marginal areas of the adjacent outer members 20a and 20b, stop-weld material 23 within the internal spaces defined by the outer and inner metal members, outer metal members 24 and 25 filling the spaces adjacent the opposite sides of the inserts 21, stop-weld material 28 and 29 between the space-filling members and the adjacent members to prevent welding thereof, members 26 and 27 filling the side spaces on opposite sides of inserts 22, and stop-weld material 30 and 31 between the latter space-filling members and the adjacent members to prevent welding thereof. The stop-weld material 23, which fills the internal spaces of the pack structure, may be formulated with a suitable sand-like compound. For example, this material may comprise a mixture of 87% zirconium silicate sand, 10% mica and 3% bentonite clay. The sand should be rather fine, e.g. sufficiently fine to pass through a 40-mesh screen, in order that it will not objectionably scratch the inner metal surfaces. This material not only prevents welding of the separated portions of outer members 20a and 20b but also prevents depression of these members during the hot rolling operation. The stop-weld material 28, 29, 30 and 31 may be magnesium oxide, aluminum oxide, zirconium oxide or any other known suitable material which will prevent welding of the adjacent surfaces at the required hot rolling temperature. The purpose of the members 24, 25, 26 and 27 is to fill in the spaces on the opposite sides of the inserts 21 and 22 and to provide outer rolling surfaces contiguous with the outer surfaces of members 20a and 20b.

The pack structure, as shown in Fig. 3, is built up in an obvious manner by arranging and superposing the components on a suitable supporting surface. In doing this, the stop-weld material 28, 29, 30 and 31 may be applied to the surfaces of the space-filling members 24, 25, 26 and 27 in any suitable manner, as by spraying, painting, etc., and the stop-weld material 23 may be troweled into the spaces after the two lower layers have been assembled. These thick strips of stop-weld can also be pre-cast, dried, and inserted into the provided spaces.

After formation of the pack structure, it is necessary to take steps to hold it together for handling as an integral structure. It may be spot-welded at the corners and at the ends of the component members, or it may be diffusion welded along the edges.

After being suitably integrated, the pack structure is heated in a furnace to a temperature sufficient for welding by hot rolling, depending upon the material or materials of which the members are composed. For example aluminum can be welded by hot rolling at temperatures from about 900° to 1050° F., copper alloys at temperatures from about 1300° to 1800° F., and steel at temperatures from about 2000° to 2300° F.

After heating, the pack structure, which is designated generally by reference numeral 32 in Fig. 6, is passed between pressure rolls 33. The rolling is in the direction of the length of the elongate members forming the components of the pack structure, and while the structure is lengthened by the rolling operation, its width is not materially affected. As described in the abovementioned patents, the desired final thickness may be attained by cold rolling. Fig. 4 is an end view of the structure as it comes from the rolling operation. The over-lapping portions of the outer members 20a and 20b and the insert members 21 and 22 are now welded together, but the surfaces of the space-filling members 24, 25, 26 and 27 remain free due to the stop-weld material between them and the adjacent members.

At this stage in the process, the end edge portions, and if necessary the side edge portions, are sheared off to permit removal of the members 24, 25, 26 and 27, so as to leave the structure as shown in Fig. 5 which comprises the integrated hollow sections 20 and web sections 21 and 22. If it is necessary to loosen the space-filling members in order to remove them, this may be done by subjecting the structure to slight transverse rolling to increase the space between those members and the adjacent members. If necessary the space-filling members may be pried out with a suitable tool.

The final expansion step to form the tubular sections is the same as the expansion step in the previously mentioned prior method by which unwelded portions of two sheets are inflated to form hollow sections, as described in the above-mentioned patents. In this step, fluid pressure is introduced into the internal spaces of the structure shown in Fig. 5 to inflate the portions 20 to the desired hollow form as shown in Fig. 7. This can be done between restraining dies or not, as desired, depending upon the extent of inflation desired. Of course, where the hollow sections are open at both ends, it is necessary to seal one end, e.g. by flattening and welding, prior to inflation after which the sealed end may be sheared off.

After inflation, the stop-weld material 23 may be blown or washed out of the internal spaces. This may be done by means of a stream of water under pressure. A sand mixture, such as that above-mentioned, will readily wash out of the internal spaces.

From the foregoing description, it will be seen that this method enables the making of articles such as shown in Figs. 1 and 2, wherein the hollow sections are relatively thick-walled and the web sections may be made as thin as desired. Reducing the thickness of the web sections merely involves decreasing the thickness of the inserts 21 and 22 and increasing the thickness of the space-filling members 24, 25, 26 and 27.

Where it is desired that the article made by this method shall be formed entirely of a single metal or alloy, the outer members 20a and 20b and the inserts 21 and 22 will all be of the same material. However, this method has the further advantage that the web sections of the finished article may be made of a different metal or alloy than that of the hollow sections. The only requirement is that the metals or alloys employed be capable of being welded together by hot rolling. It should be noted further that if a lower melting metal or alloy such as copper is employed for the inserts 21 and 22 than that employed for the outer members 20a and 20b, the rolling temperature may be lower than that required where the members are formed of some higher melting material such as steel. Thus copper will roll weld to steel at a temperature of about 1600° to 1800° F., whereas steel-to-steel roll welding requires a temperature of about 2000° to 2300° F. The bonding at lower temperature is very desirable as it reduces surface oxidation which causes pitting that must be removed at considerable expense. It also requires less heating time, which also reduces cost.

A further advantage of this method employing inserts is that the inserts form portions of the internal surfaces of the finished hollow sections, as may be seen in Fig. 7, and they give a smooth rounded surface when the inflation operation is performed. Thus, the inserts prevent formation of a sharply defined V, which is an inherent objection of the prior method involving expansion of unwelded areas of two plates, and they permit greater inflation into fully round tubes. Without the inserts, such full inflation tends to cause rupture of the metal.

Figs. 8 to 10 show the formation, from a simple pack structure, of an article comprising hollow sections and joining sections. Fig. 8 is an end view of a pack structure comprising two outer members 34 and 35 which are co-extensive with the structure, inserts 36 which are to form a portion of the adjoining sections, side inserts 37, and stop-weld material 38 filling the internal spaces defined by the outer members and the inserts. This pack structure is treated in the same manner as previously described, and after roll welding to the form shown in Fig. 9, fluid pressure is introduced into the internal spaces to form the hollow sections. Depending upon whether or not restraining dies are used, the finished article may take a form such as those shown in Figs. 10a and 10b. The inserts 36 and 36 form smooth rounded surfaces inside the hollow sections, as in the previously described embodiment. Furthermore, here again, it is possible to use lower melting material for the inserts, thus enabling hot roll welding or bonding at lower temperature.

In any case, the thickness of the inserts may be chosen according to the thickness of the outer members. Where thick plates or sheets are involved the inserts may be of substantial thickness, but where thin sheets are involved, the inserts may be quite thin.

In some instances, instead of employing separate inserts they may take the form of a coating or layer plated upon either or both of the inner surfaces of the outer members.

A finished article, such as shown in Figs. 10a and 10b, can be provided with an external cladding. For example, porcelain enamel may be applied to steel to provide external cladding.

Figs. 11 to 13 show the formation of a similar article which, however, is provided with external cladding by roll welding. As shown in Fig. 11, a pack structure is formed comprising two outer members 39 and 40, cladding metal sheets 41 and 42 engaging the outer faces of the metal members 39 and 40, metal insert members 43 and 44, and stop-weld material 45 filling the inner spaces between the insert members. Thus, where it is desired to provide stainless steel or other cladding on the outside of an article of the general character here involved, a pack structure such as that shown in Fig. 11 may be hot rolled to effect welding of the interengaging surfaces and to reduce the thickness to the desired extent as shown in Fig. 12. Fluid pressure is introduced into the internal spaces to form hollow sections. The resulting article, shown in Fig. 13 as having been formed without restraining dies, has hollow sections 47. The illustrated article is similar to that of Fig. 10a but has the external cladding 41 and 42 on the outer surfaces thereof.

Figure 15:
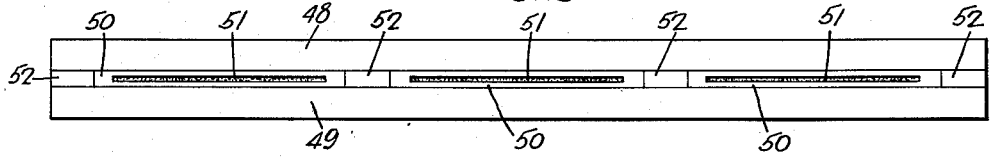
Fig. 15 is a similar view of the same structure after hot rolling.
Figure 16:
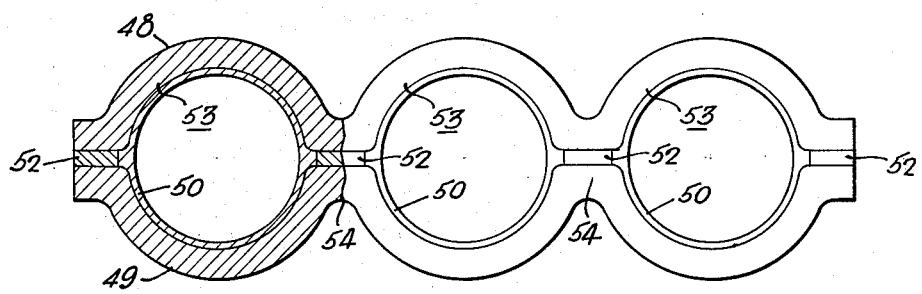
Fig. 16 is an end view of the resulting article.

Figs. 14 to 16 show the formation of a generally similar article having cladding on the internal surfaces of the hollow sections. As shown in Fig. 14, a pack structure is first formed comprising a pair of outer metal members 48 and 49, flattened metal tubes 50 between members 48 and 49 in the areas which are to form hollow sections, stop-weld material 51 within each flattened tube to prevent welding of the opposed inner surfaces thereof, and inner metal members 52 in the internal spaces between the flattened metal tubes. Thus where it is desired to form an article having stainless steel or copper cladding on the inner surfaces of the hollow sections, stainless steel or copper tubes of suitable dimensions may be flattened to the form shown in Fig. 14 and embodied in the pack structure. It will be noted that these tubes, though flattened, have rounded internal side surfaces.

The pack structure is heated to a suitable temperature and is then hot rolled in the direction of the length of the flattened tubes to effect welding of the metal components and to reduce the thickness to the desired extent. Fig. 15 shows the structure after hot rolling.

After hot rolling, fluid pressure is introduced to form the desired article, such as shown in Fig. 16, having hollow sections 53 and joining sections 54. The stop-weld material may be blown or flushed out of the tubes after some expansion or after full expansion.

Figure 17:
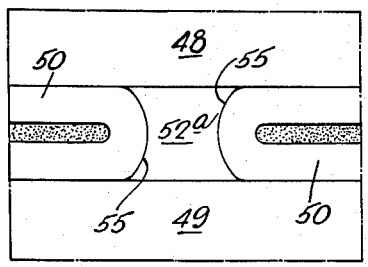
Figs. 17 and 18 are views showing possible modifications of the structure of Figs. 14 to 16.
Figure 18:
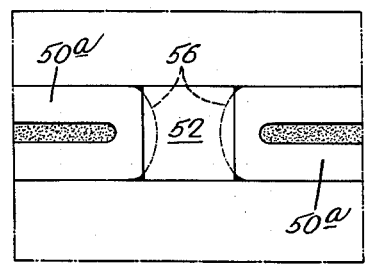

Figs. 17 and 18 show modifications which may be resorted to in order to insure smooth fit of the flattened tubes and the inserts and thus insure better welding of these members. In Fig. 17, one of the inserts 52a is shown having concave sides 55 to fit the adjacent surfaces of the flattened tubes 50. In Fig. 18, the flattened tubes 50a have had their side edges trimmed to fit snugly against the straight sides of the insert 52. The dotted lines 56 represent the rounded side surfaces of the flattened tubes prior to trimming.

A further feature of this invention relates to the use of fluxes and/or oxidizers within a pack structure where an article is to be made by pressure weld bonding of only certain areas of members of the pack structure, and by expanding unwelded areas to form hollow sections in the finished article. In any case involving the hot rolling of a pack structure, the welding of the interengaging surfaces of the metal components of the pack structure is adversely affected by oxidation of said surfaces. In the past it has been necessary to take precautions to minimize or substantially eliminate oxidation of the surfaces to be welded. The practice has been to thoroughly clean the members before assembling them into the pack structure, and to seal the edges of the pack structure so as to prevent admission of air between the surfaces to be welded, thus preventing oxidation of those surfaces. However, even when the pack structure is edge sealed, some oxidation of the internal surfaces takes place during the interval between thorough cleaning of the component members and sealing of the pack structure.

In accordance with one feature of this invention, a suitable weld-promoting flux may be provided on one or both surfaces to be welded to prevent or minimize oxidation and to enhance the weld bonding of the surfaces as described below. The metal members to be assembled in the pack structure may be dipped in a degreasing solution and then may be dipped into a solution of a suitable flux and hot water. Alternatively the flux solution may be sprayed onto the surfaces which are to be welded together. Any suitable flux for the metal used may be employed, for example for copper the flux may comprise a mixture of 2.6 parts potassium, 1 part boron, 1.8 parts fluorine, and less than 0.1% sodium. This flux, at an elevated temperature such as 1600° F., is sufficiently fluid to flow backward under the squeezing pressure of the rolls, which enables it to chemically clean the surfaces at the very instant that the weld bond is to be formed. At the hot rolling temperature the flux is in the form of a paste, and as the hot rolling takes place it is squeezed rearwardly and emerges from between the members as they are welded together. The flux changes the surface tension of the metal members and it produces wetting of the surfaces and thus enhances the weld bonding of the surfaces.

The flux need not be in the form of a liquid or paste. It may comprise a material in the stop-weld which will give off gas during heating of the pack structure. For example sodium fluoride will release fluorine, and sodium chloride will release chlorine. The released gas will dissolve oxides on the surfaces to be bonded, and will escape rearwardly during rolling, leaving the surfaces clean at the very instant that the weld bond is to be formed.

The use of a flux as above described not only enhances the weld bonding of the metal components of a pack structure but it also eliminates the necessity of sealing the edges of the pack structure against admission of air. With the flux present on the surfaces to be welded, there is no need to take the above-mentioned precautions to prevent oxidation of the surfaces. Thus the use of a flux reduces labor cost and effects a saving of time.

This invention further contemplates the use of an oxidizer as an addition to the stop-weld material to aid in the prevention of oxidation of the surfaces which are to be welded. The term "oxidizer" is here used to designate a material having an affinity for oxygen, i.e. a material which will absorb oxygen and form an oxide. By providing an oxidizer in the stop-weld material, the oxygen present in the air between the surfaces to be welded is caused to be absorbed by the oxidizer which forms harmless oxide within the stop-weld material and prevents the oxygen from forming oxide on the surfaces to be welded. Any metal which readily forms an oxide may be used as the oxidizer. For example aluminum readily forms aluminum oxide, and magnesium readily forms magnesium oxide. Therefore, aluminum or magnesium powder may be mixed into the stop-weld material to serve as the oxidizer. Other metals which may be used are silicon, manganese and iron.

It should be noted that the oxidizer is here used as an addition to stop-weld material to absorb oxygen without affecting the efficiency of the stop-weld material. In the past, graphite has been proposed for use as stop-weld material, and while the carbon in graphite will absorb and unite with oxygen at temperatures above 1600° F., the reaction will effectively destroy the stop-weld material as such and will defeat its purpose.

The invention contemplates the use of either a flux or an oxidizer or both in a pack structure which is to be hot rolled in the process of forming an article having hollow sections which are formed by expansion of the metal members in the areas of the stop-weld material.

From the foregoing description, it will be seen that the present invention makes use of inserts to form various articles from various pack structures and to provide the advantages hereinbefore set forth. The invention further makes use of fluxes and/or oxidizers to enhance the weld bonding in a pack structure and to attain other advantages. While certain embodiments of the invention have been illustrated and described for the purpose of disclosure, the invention is not limited thereto but contemplates any modification or further embodiments such as may occur to those skilled in the art.

I claim:

A method of making plate or sheet metal articles having hollow formations, which comprises forming a pack structure having superposed metal members and stop-weld material therebetween in the areas which are to form hollow sections, and having non-gaseous fluxing material comprising a halide compound between said members which emits a halogen gas when heated to dissolve oxides in the areas which are to be welded together with said pack structure having a portion of the adjacent edges of said members unsecured to permit venting of all said halogen gas, heating the pack structure to a temperature to enable pressure weld bonding of said members in the latter areas, rolling the heated pack structure to effect welding in the latter areas and to reduce the thickness of the structure with the temperature during said welding being sufficiently high to induce the emission of said halogen gas from said compound, and applying fluid pressure between said members in the unwelded areas to expand said members in the unwelded areas to produce the desired hollow sections.

References Cited in the file of this patent

UNITED STATES PATENTS

| Number | Name | Date |
|---|---|---|
| 56,680 | Terwilliger | July 24, 1866 |
| 99,805 | Absterdam | Feb. 15, 1870 |
| 377,317 | Marshall | Jan. 31, 1888 |
| 427,924 | Smith | May 13, 1890 |
| 1,127,041 | Lloyd | Feb. 2, 1915 |
| 1,142,711 | Isaacs | June 8, 1915 |
| 1,886,615 | Johnson | Nov. 8, 1932 |
| 2,212,481 | Sendzimir | Aug. 20, 1940 |
| 2,277,064 | Bialosky | Mar. 24, 1942 |
| 2,498,275 | Johnson | Feb. 21, 1950 |
| 2,646,259 | Powell | July 21, 1953 |
| 2,646,971 | Raskin | July 28, 1953 |
| 2,732,615 | Sandberg | Jan. 31, 1956 |
| 2,740,188 | Simmons | Apr. 3, 1956 |
| 2,779,086 | Rieppel et al. | Jan. 29, 1957 |
| 2,851,770 | Fromson | Sept. 16, 1958 |

FOREIGN PATENTS

| Number | Country | Date |
|---|---|---|
| 1,467 | Great Britain | Jan. 31, 1888 |